(12) United States Patent
Bolt

(10) Patent No.: US 12,088,093 B1
(45) Date of Patent: Sep. 10, 2024

(54) 7-PIN JUMPER CABLES

(71) Applicant: Thoughts To Reality Concept and Design LLC, Shelby, NC (US)

(72) Inventor: David Brian Bolt, Shelby, NC (US)

( * ) Notice: Subject to any disclaimer, the term of this patent is extended or adjusted under 35 U.S.C. 154(b) by 0 days.

(21) Appl. No.: 18/583,707

(22) Filed: Feb. 21, 2024

Related U.S. Application Data

(60) Provisional application No. 63/486,205, filed on Feb. 21, 2023.

(51) Int. Cl.
| | |
|---|---|
| *H02J 1/10* | (2006.01) |
| *H01R 11/24* | (2006.01) |
| *H01R 13/447* | (2006.01) |
| *H01R 13/633* | (2006.01) |
| *H01R 13/717* | (2006.01) |
| *H01R 24/66* | (2011.01) |
| *H01R 24/76* | (2011.01) |
| *H01R 103/00* | (2006.01) |
| *H02J 7/00* | (2006.01) |
| *H02J 7/34* | (2006.01) |

(52) U.S. Cl.
CPC .............. *H02J 1/122* (2020.01); *H01R 11/24* (2013.01); *H01R 13/447* (2013.01); *H01R 13/6335* (2013.01); *H01R 13/7175* (2013.01); *H01R 24/66* (2013.01); *H01R 24/76* (2013.01); *H02J 7/0042* (2013.01); *H01R 2103/00* (2013.01); *H01R 2201/26* (2013.01); *H02J 7/342* (2020.01)

(58) Field of Classification Search
CPC .......... H02J 7/342; H02J 1/122; H02J 7/0042; H01R 11/24; H01R 13/447; H01R 13/6335; H01R 13/7175; H01R 24/66; H01R 24/76; H01R 2103/00; H01R 2201/26

See application file for complete search history.

(56) References Cited

U.S. PATENT DOCUMENTS

| | | | |
|---|---|---|---|
| 4,272,142 A | | 6/1981 | Zapf |
| 4,938,712 A | | 7/1990 | Black |
| 6,254,426 B1 | | 7/2001 | Iacovelli et al. |
| 6,527,585 B1 | | 3/2003 | Pannone |
| 6,896,544 B1 | | 5/2005 | Kuelbs et al. |
| 6,921,286 B1 | | 7/2005 | Fernandez |
| 10,439,413 B1 | * | 10/2019 | Miller ................ H01R 13/7175 |
| 2005/0110467 A1 | * | 5/2005 | Thomason ............ H02J 7/0031 |
| | | | 320/165 |
| 2006/0128209 A1 | * | 6/2006 | Chai ...................... H01R 11/24 |
| | | | 439/504 |
| 2012/0202377 A1 | | 8/2012 | Puluc et al. |

(Continued)

OTHER PUBLICATIONS

TOPDC 4 Gauge 16 Feet Jumper Cables for Car, SUV and Trucks Battery, Heavy Duty Automotive Booster Cables for Jump Starting Dead or Weak Batteries with Carry Bag(TD-P0416), retrieved from the internet, retrieved on Jun. 6, 2023, <URL: https://www.amazon.com/TOPDC-Jumper-Cables-Light-Booster/dp/B07L4CHDRB?th=1>.

*Primary Examiner* — David V Henze-Gongola

(57) ABSTRACT

A jumper cable assembly that comprised of a first jumper unit and a second jumper unit. One jumper cable has a port while another jumper cable has a plug. The plug and the port are designed to be connected to one another. Once the two jumper units are connected to another, a full jumper cable set is formed. Each jumper unit has a positive cable and a negative cable. Each negative cable and positive cable have a clamp connected one of end. The inner surface of each clamp is equipped with teeth.

16 Claims, 12 Drawing Sheets

(56) References Cited

U.S. PATENT DOCUMENTS

2015/0130401 A1* 5/2015 Pierson .................. H02J 1/122
  320/105
2020/0295575 A1* 9/2020 Nook .................... H02J 7/0031

* cited by examiner

7-PIN JUMPER CABLES

FIELD OF THE INVENTION

The present invention relates generally to jumper cables. More specifically, the present invention relates to jumper cables with a 7-pin connection.

BACKGROUND OF THE INVENTION

Often times one may need to jump their vehicle. Standardly, jumper cables come as a single unit of jumper cables with two sets of alligator clips. Each set of alligator clips has a positive end and a negative end. One set of clips is connected to one vehicle, which has a dead battery, while the second set is connected to a second vehicle, which has a running battery. The positive clip is connected to the positive port of one's car battery with the negative clip connected to the negative port of one's car battery. Battery power is transferred from the operating vehicle to the vehicle with a dead battery. A standard jumper cable set has a central cord connecting two sets of claws.

However, sometimes cables are not long enough to each to the other car. To combat this, this set of jumper cables is a two-component set of jumper cables. The two components can connect to one another to form a single set of jumper cables. Alternatively, this 7 pin jumper cable can be connected to the port of a trailer, allowing one to only need one of the two components of the jumper cable set to jump a vehicle with a dead battery.

DETAIL DESCRIPTIONS OF THE INVENTION

Figure 1:
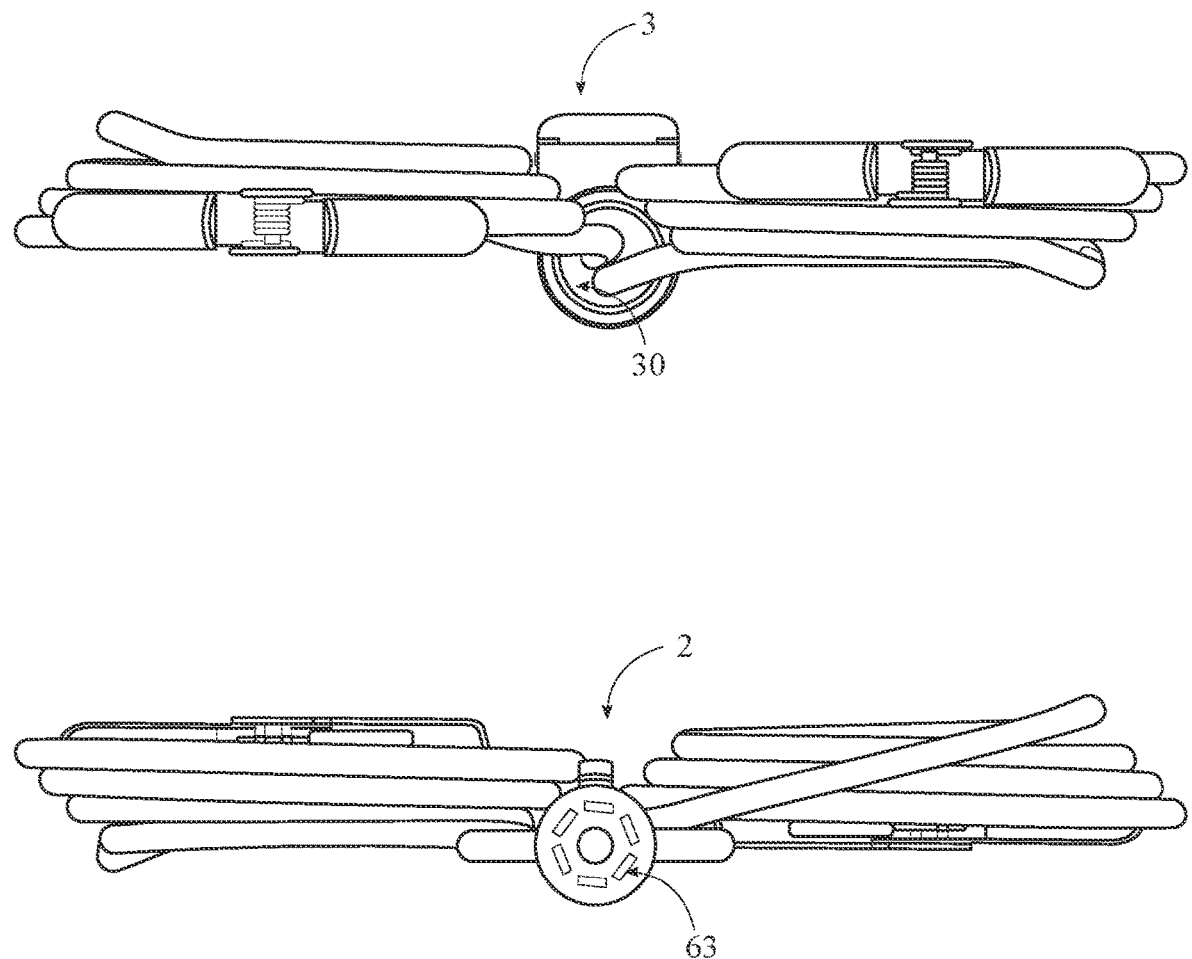
FIG. 1 is a right view thereof showing my new design with the cables separated.
Figure 2:
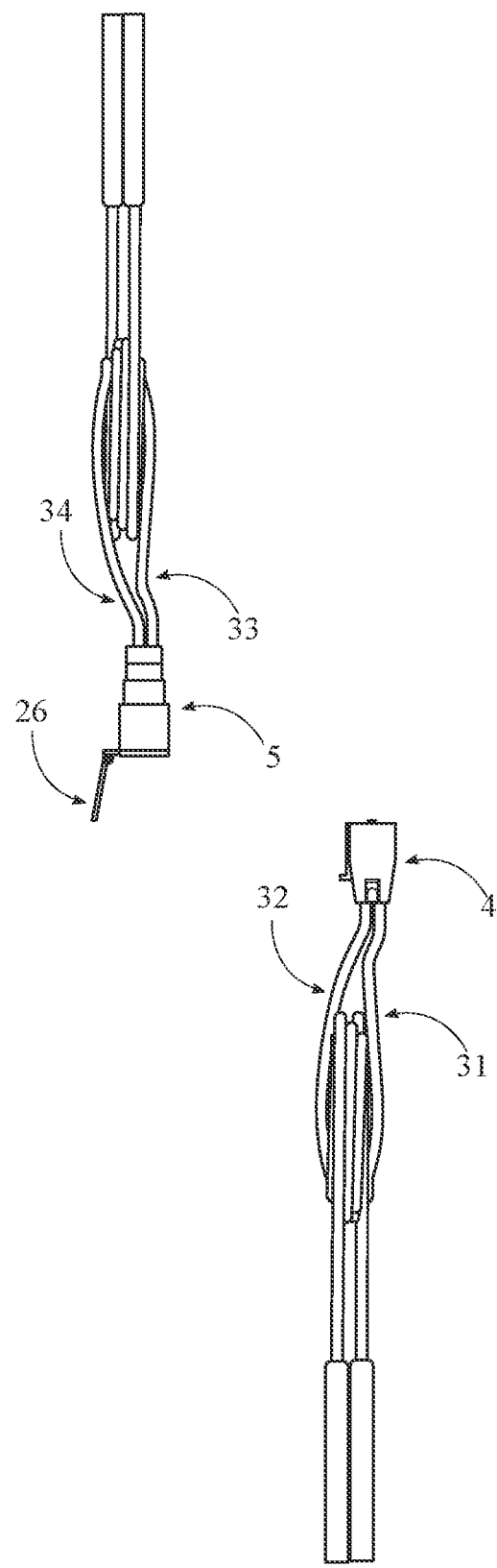
FIG. 2 is a front perspective view thereof with the cables separated.
Figure 3:
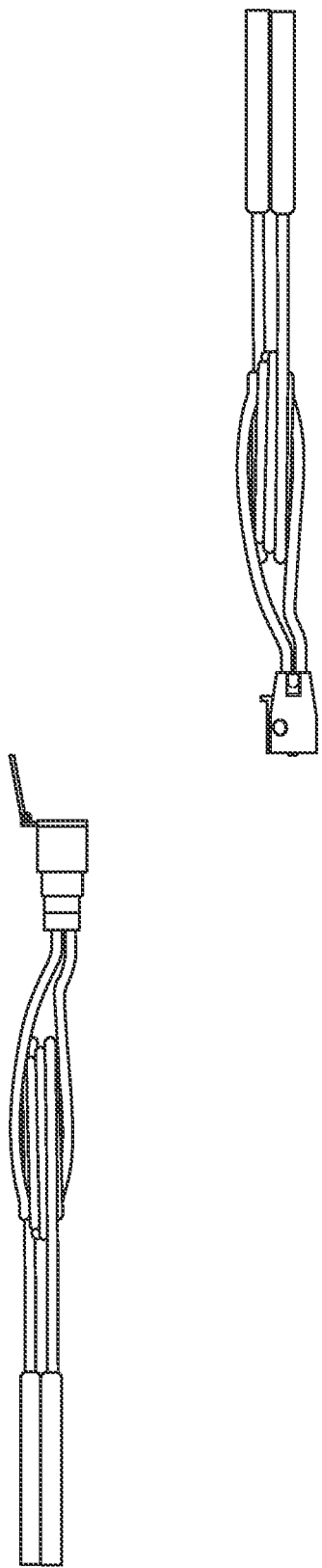
FIG. 3 is a rear perspective view thereof with the cables separated.
Figure 4:
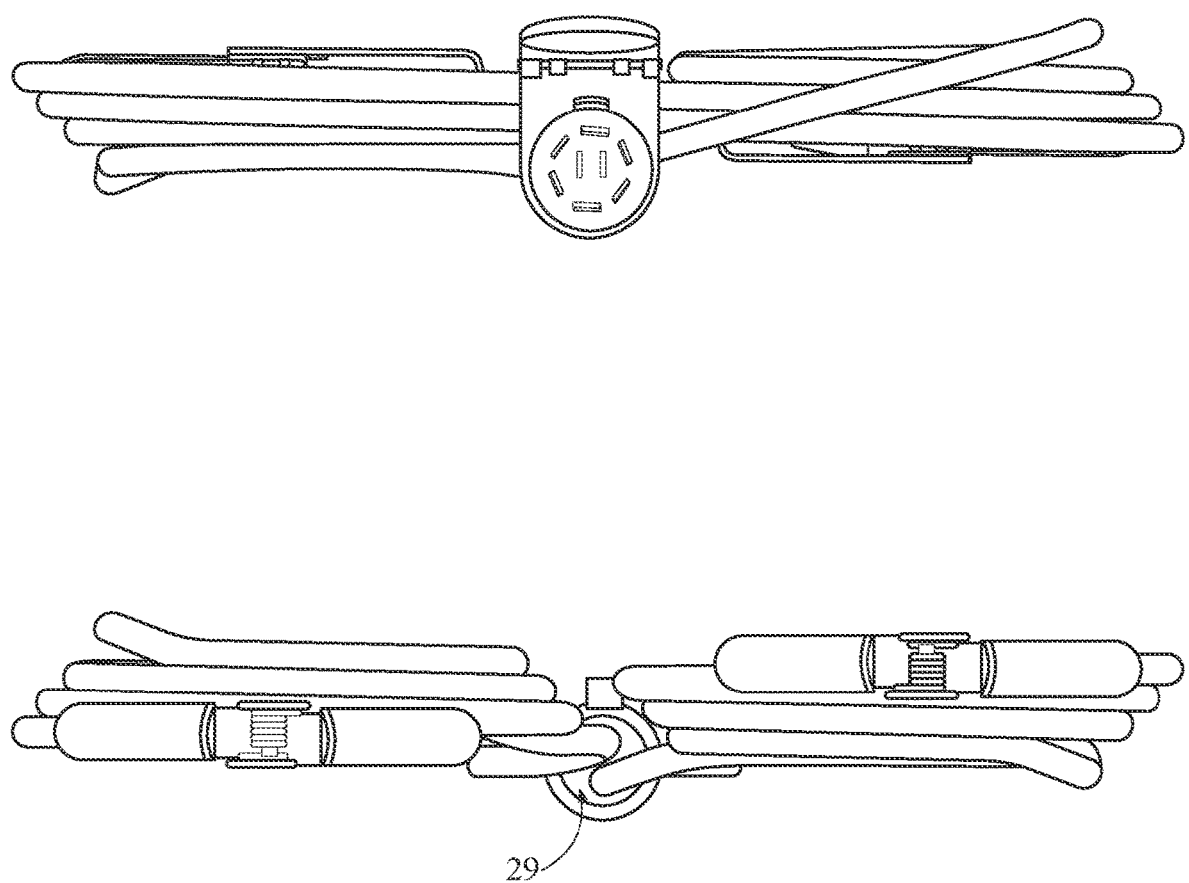
FIG. 4 is a left view thereof with the cabled separated.
Figure 5:
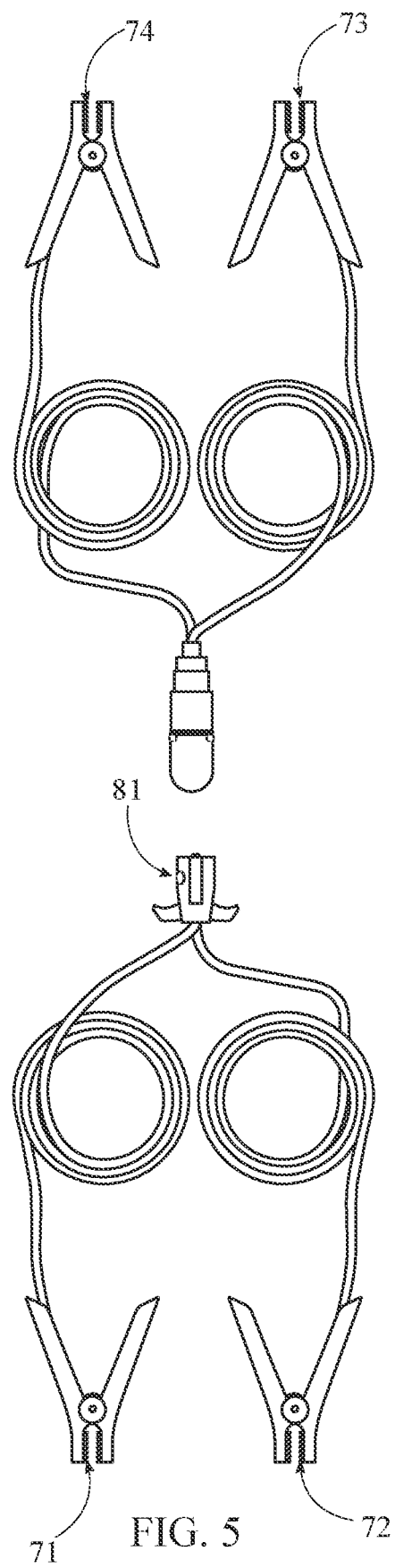
FIG. 5 is a top elevational view thereof with the cables separated.
Figure 6:
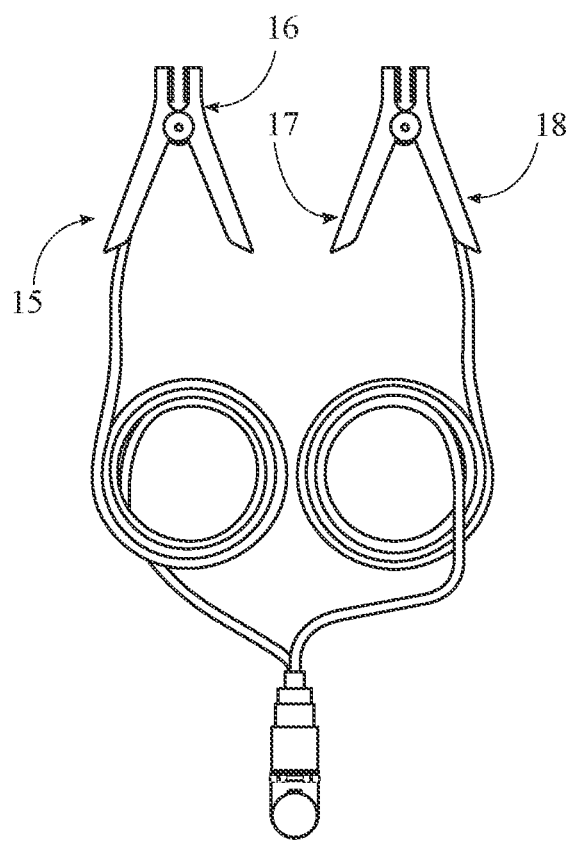
FIG. 6 is a bottom elevational view thereof with the cables separated.
Figure 6:
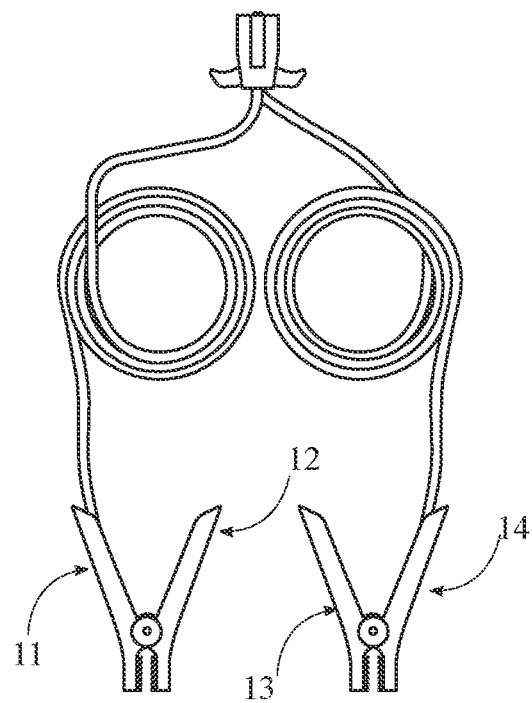
Figure 7:
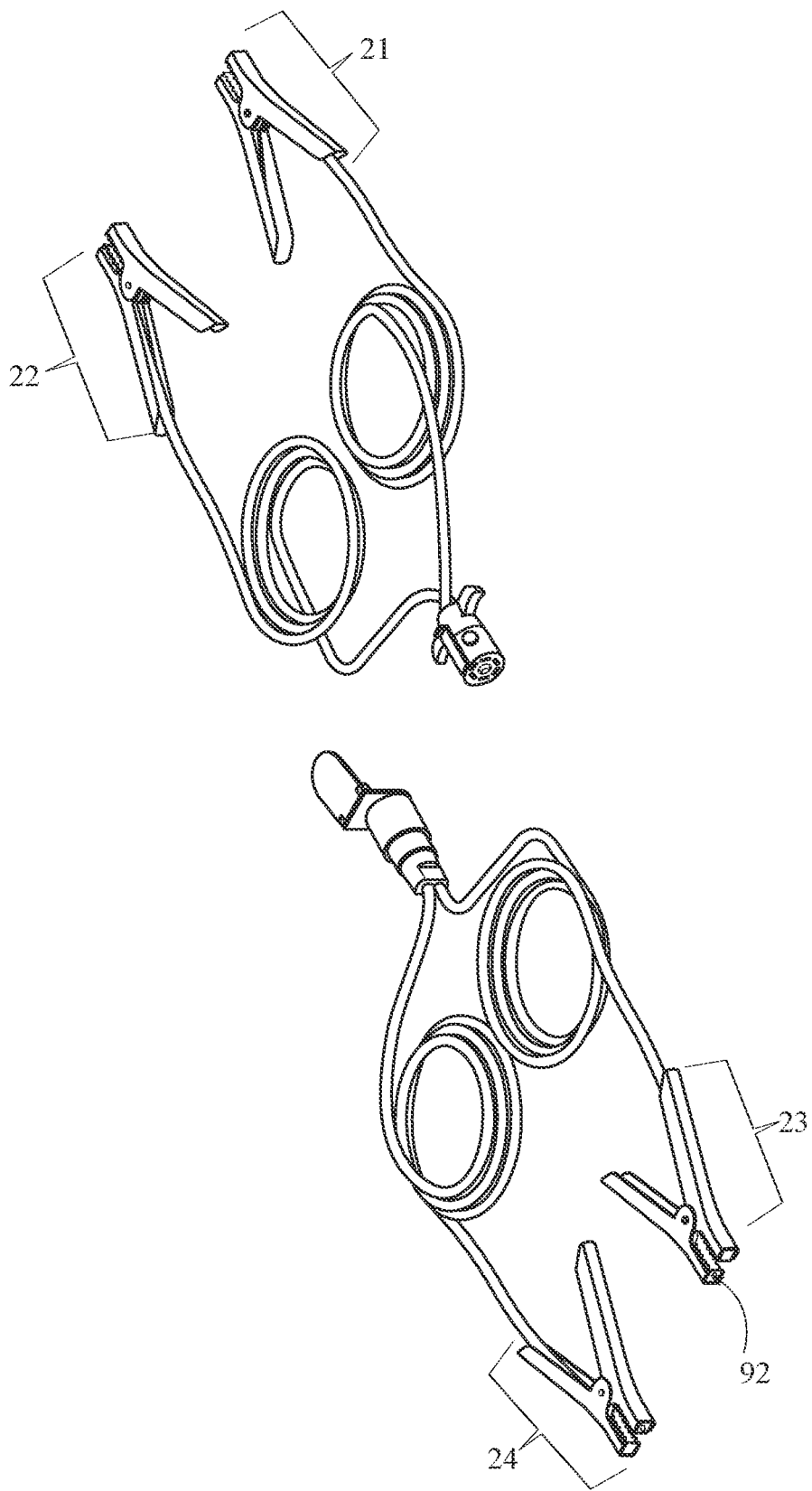
FIG. 7 is a bottom-left-front elevational view thereof with the cable with the cables separated.
Figure 8:
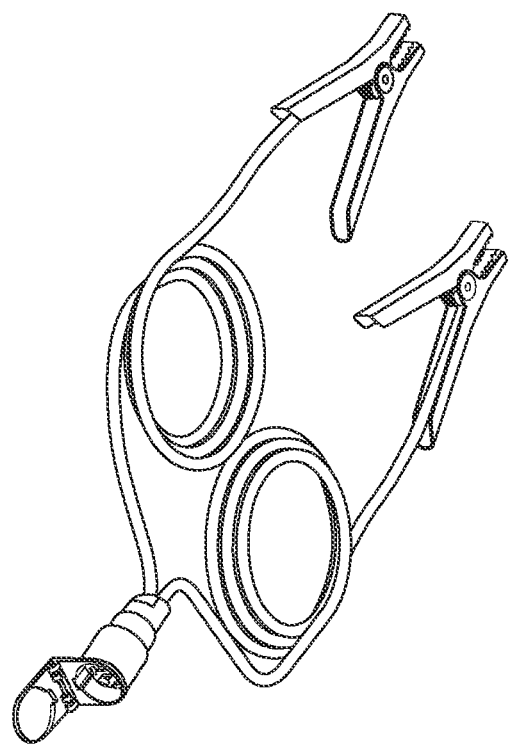
FIG. 8 is a top-left-front elevational view thereof with the cables separated.
Figure 8:
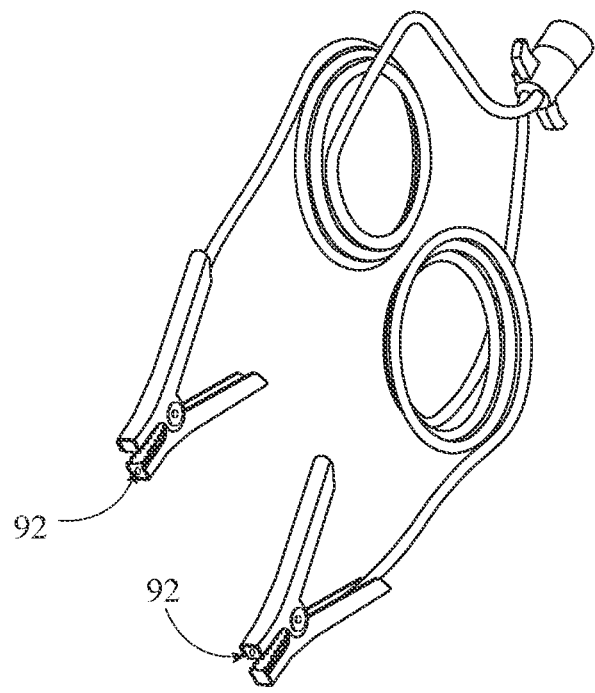
Figure 9:
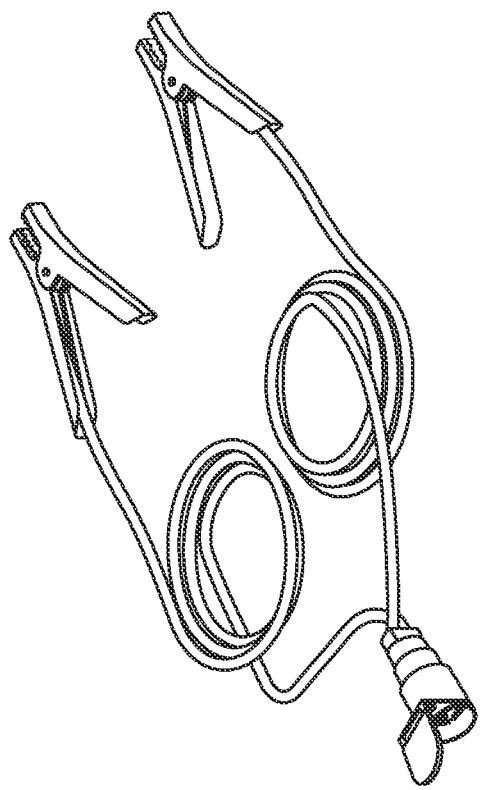
FIG. 9 is a front plan view thereof with the cables attached.
Figure 9:
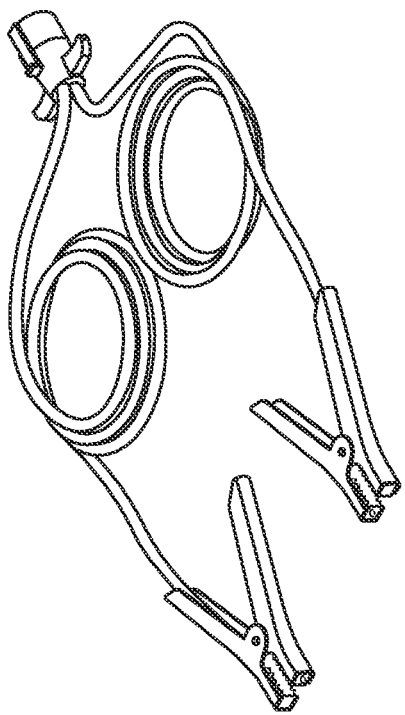
Figure 10:
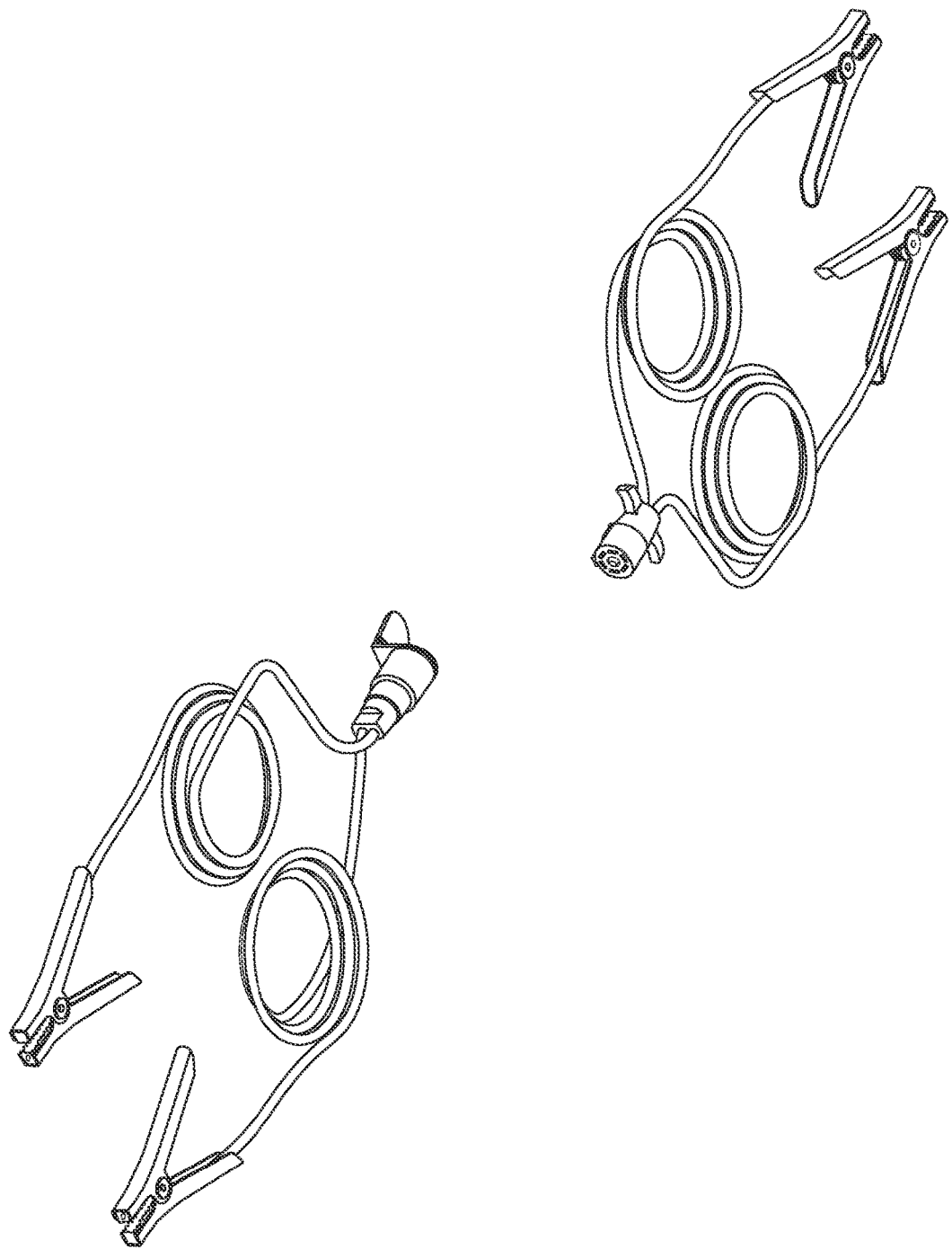
FIG. 10 is a front-top-left perspective view thereof with the cables attached.

The present invention is a jumper cable assembly 1. This design is a two-part jumper cable assembly, that when connected by way of a 7-pin plug 4 and a port 5 with 7 sockets, it forms a single jumper cable set. The jumper cable set can also be used by using the jumper cable unit that contains the 7-pin plug 4. This plug 4 can be connected to the port 5 one would find on a trailer. From here, one can transfer power from the trailer unit to the vehicle the jumper cable assembly is connected to in order to "jump" the battery of the vehicle. In the preferred embodiment the jumper cable will be made out of metal. However, the cables are coated with a heavy duty wax coating to the protect the use and ensure no electrical charges to emitted that could burn the users skin. The handles are also coated with a protective rubber coating.

It works by having a first jumper unit 2 and a second jumper unit 3. The first and second jumper units and almost identical, except that one unit has a 7-pin plug 4, while the other jumper unit a 7-pin port 5. The first jumper unit 2 has a first negative clamp 21, a first positive clamp 22 and a plug 4. Similarly, the second jumper unit 3 has a second negative clamp 23, a second positive clamp 24, and a port 5. The plug 4 is slightly smaller in size than the port 5. This is so that the plug 4 fits snugly within the port 5 when the two jumper units are connected to a form a single jumper cable set.

The first jumper unit 2 has a first positive cable 31 and first negative cable 32. The plug 4 has a plurality of finger grips 41. In the preferred embodiment, there are two finger grips. The plug 4 is cylindrical in shape and the plurality of finger grips 41 are positioned on the exterior surface of the plug 4. The plurality of finger grips 41 are spaced across from one another so that when the plug 4 is being used, the user can apply some force against the plug 4 when inserting it into the port 5 and the plug 4 is not dropped. The plug 4 has an exposed face and a connecting face. The connecting face is the face that is inserted into the port 5 while the exposed face is the face that extends outward and is not covered while in use. The connecting face has a plurality of sockets. These sockets and where the "7-pins" will be inserted when the plug 4 and the port 5 are connected to one another. The first positive cable 31 and the first negative cable 32 are centrally positioned on the exposed face of the plug 4. The first positive cable 31 and first negative cable 32 are positioned directly next to one another on the exposed face of the plug 4.

The first positive clamp 22 is connected to the first positive cable 31 opposite the end where the plug 4 connects to the first positive clamp 22. Additionally, the first negative clamp 21 is connected to the first negative cable 32 opposite the end where the plug 4 connects to the first negative clamp 21. The first positive clamp 22 has two handles, an upper handle 13 and a lower handle 14. The upper handle 13 of the first positive clamp 22 and the lower handle 14 of the first positive clamp 22 are hingedly connected with a spring. The spring has an aperture with a central support beam traversing the length of the aperture. This central support beam extends through the sidewall of the upper handle 13 of the first positive clamp 22 and lower handle 14 of the first positive clamp 22.

The first negative clamp 21 has an upper handle 11 and a lower handle 12. The upper handle 11 of the first negative clamp 21 and the lower handle 12 of the first negative clamp 21 are hingedly connected with a spring. The spring has an aperture with a central support 5 beam traversing the length of the aperture. This central support 5 beam extends through the sidewall of the upper handle 53 of the first negative clamp 21 and lower handle 54 of the first negative clamp 21.

The first positive clamp 22 and the first negative clamp 21 are equipped with a plurality of teeth 72. The plurality of teeth 72 are jagged in nature. This jagged surface provides grip or traction for when the clamps are connected to a vehicle battery. A plurality of first positive clamp teeth 72 are positioned on the interior surface of the upper handle 53 of the first positive clamp 22 and the interior surface of the lower handle 54 of the first positive clamp 22. A plurality of first negative clamp teeth 71 being positioned on the interior of the upper handle 53 of the first negative clamp 21 and the interior surface of the lower handle 54 of the first negative clamp 21.

The second jumper unit 3 is formed by a second positive cable 33 and a second negative cable 34. The port 5 on the second jumper 3 unit has a cover 26. The port 5 has concave edge that is connected by a flat edge. The port 5 has an exposed face a covered face. The exposed face is the face that is exposed to the air when the jumper cable assembly is in use. The covered face is covered by the cover 26 of the port 5. This cover 26 is pivotably connected to the flat edge of the covered face. The second positive cable 33 and the second negative cable 34 being centrally positioned on the exposed face of the port 5. The second positive cable 33 and the second negative cable 34 are positioned side by side on another on the exposed face of the port 5. The second positive clamp 24 is connected to the second positive cable 33 opposite where the second positive cable 33 connects to the plug 4. The second negative clamp 23 being connected to second negative cable 34 opposite the plug 4. The port 5 is cylindrical in shape. The covered face has a counterbore 61 in which there are a plurality of pins 62 being positioned inside the counterbore 61. These plurality of pins 62 are inserted into the plurality of sockets on the plug 4.

The second positive clamp 24 has an upper handle and a lower handle 18 as well as the second negative clamp 23 has an upper handle and lower handle. The upper handle of the second positive clamp 24 and the lower handle 18 of the second positive clamp 24 are hingedly connected with a spring. The spring has an aperture with a central support beam traversing the length of the aperture. This central support beam extends through the sidewalls of the upper handle of the second positive clamp 24 and lower handle 18 of the second positive clamp 24. There is a plurality of second positive clamp teeth 73 being positioned on the interior of the upper handle of the second positive clamp and the interior surface of the lower handle of the second positive clamp. There is also a plurality of second negative clamp teeth 74 being positioned on the interior of the upper handle of the second negative clamp and the interior surface of the lower handle of the first negative clamp.

The second negative clamp 23 has an upper handle and a lower handle 16. The upper handle of the second negative clamp 23 and the lower handle 16 of the second negative clamp 23 are hingedly connected with a spring. The spring has an aperture with a central support 5 beam traversing the length of the aperture. This central support 5 beam extends through the sidewalls of the upper handle of the second negative clamp 23 and lower handle 16 of the second negative clamp 23.

Figure 11:
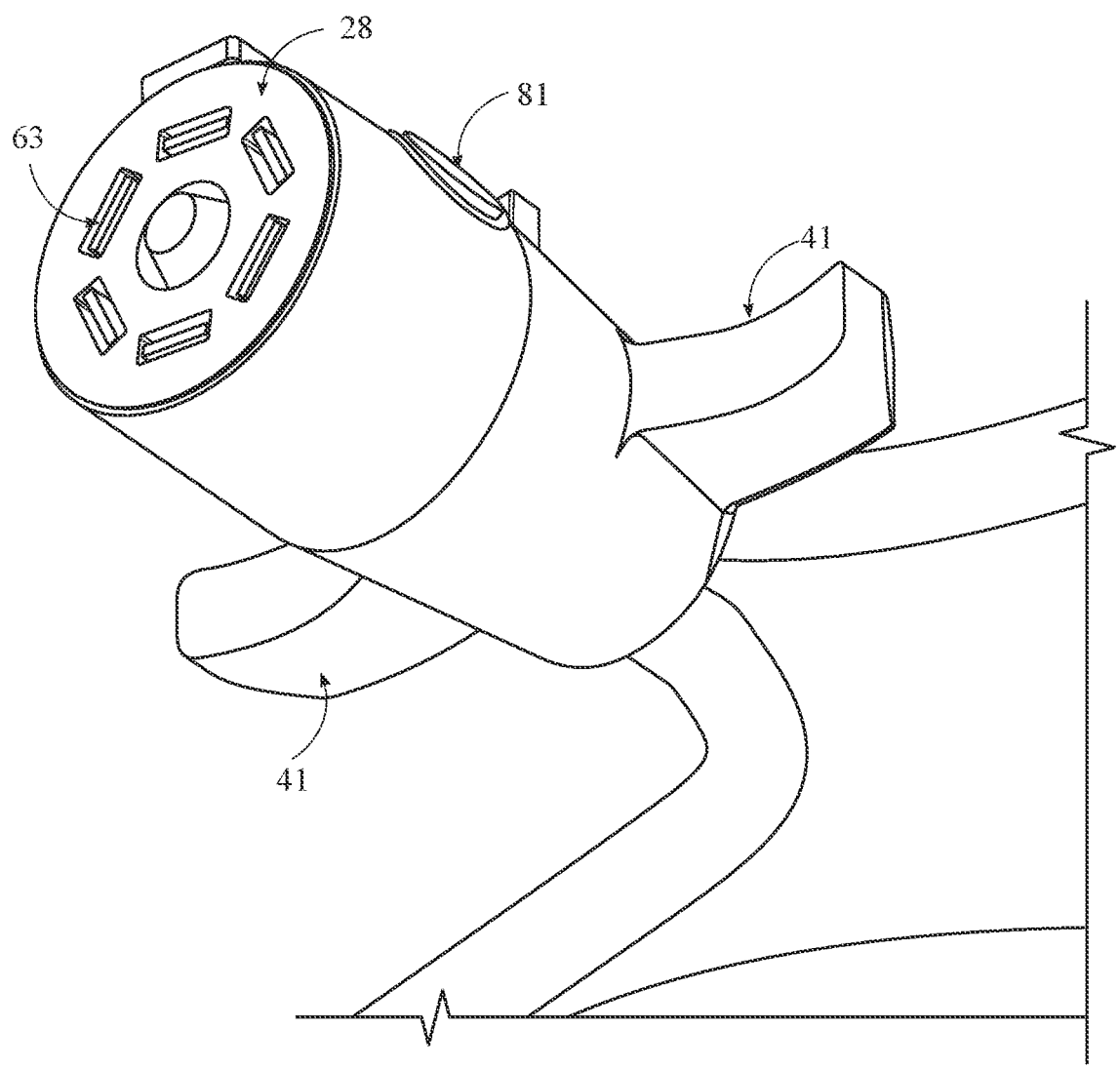
FIG. 11 is a right perspective view thereof of the internal 7-pin prong.
Figure 12:
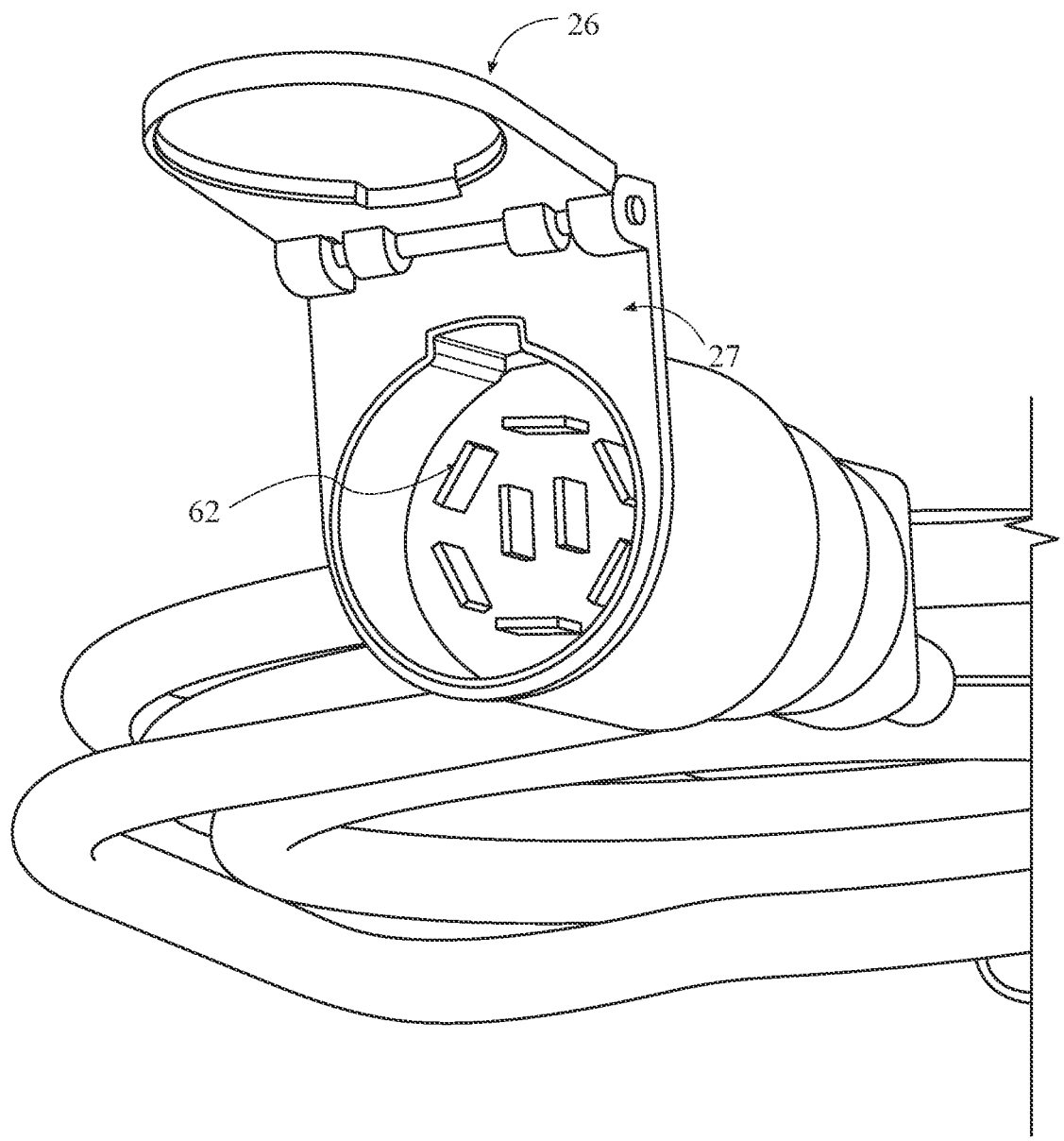
FIG. 12 is an interval view thereof of the 7-pin port.

The first positive clamp and the first negative clamp have a LED light positioned on the exterior surface of the clamp. The second positive clamp and the second negative clamp have a LED light positioned on the exterior surface of the clamp. When the jumper cable assembly unit is connected and in use, these LED lights illuminate, providing additional light for the user to be able to see. Additionally, there is a switch button 81 positioned on the exterior surface of the plug as shown in FIG. 11.

Although the invention has been explained in relation to its preferred embodiment, it is to be understood that many other possible modifications and variations can be made without departing from the spirit and scope of the invention

What is claimed is:

1. A jumper cable assembly comprising:
   A first jumper unit;
   A second jumper unit;
   the first jumper unit comprising a first negative clamp, a first positive clamp, and a plug;
   the first jumper unit further comprising a first positive cable and a first negative cable;
   the plug having an exposed face and a connecting face;
   the plug having a plurality of finger grips;
   the first positive clamp and the first negative clamp having an LED light located on exterior surface of the clamp;
   each of the plurality of finger grips being on the exterior surface of the plug;
   the first positive cable and the first negative cable being centrally positioned on the exposed face of the plug;
   the first positive clamp being connected to the first positive cable opposite the plug;
   the first negative clamp being connected to first negative cable opposite the plug;
   the plug being cylindrical in shape;
   the plug having a switch positioned on the exterior surface in between the plurality of finger grips; and
   the connecting face having a plurality of sockets.

2. The jumper cable assembly as claimed in claim 1, comprising:
   the first positive clamp having an upper handle and a lower handle;
   the upper handle of the first positive clamp and the lower handle of the first negative clamp being hingedly connected with a spring;
   the first negative clamp having an upper handle and a lower handle; and
   the upper handle of the first negative clamp and the lower handle of the first negative clamp being hingedly connected with a spring;
   the upper handle of the first negative clamp and the lower handle of the first negative clamp being connected at a center point of the upper handle of the first negative clamp and the lower handle of the first negative clamp; and
   the upper handle of the first positive clamp and the lower handle of the first positive clamp being connected at a center point of the upper handle of the first positive clamp and the lower handle of the first positive clamp.

3. The jumper cable assembly as claimed in claim 2 comprising:
   a plurality of first positive clamp teeth being positioned on the interior of the upper handle of the first positive clamp and the interior surface of the lower handle of the first positive clamp; and
   a plurality of first negative clamp teeth being positioned on the interior of the upper handle of the first negative clamp and the interior surface of the lower handle of the first negative clamp.

4. The jumper cable assembly claimed in claim 1, comprising:
   the second jumper unit comprising a second negative clamp, a second positive clamp, and a port;
   the second positive clamp and the second negative clamp having an LED light located on exterior surface of the clamp;
   the second jumper unit further comprising a second positive cable and a second negative cable;
   the port having a cover;
   the port having an exposed face and a covered face with the covered face having a flat edge and a concave edge;

the cover being pivotably connected to the flat edge of the covered face;

the second positive cable and the second negative cable being centrally positioned on the exposed face of the port.

5. The jumper cable assembly as claimed in claim 4, comprising:

the second positive clamp being connected to the second positive cable opposite the plug;

the second negative clamp being connected to second negative cable opposite the plug;

the port being cylindrical in shape;

the covered face having a counterbore; and a plurality of pins being positioned inside the counterbore.

6. The jumper cable assembly as claimed in claim 4, comprising:

the second positive clamp having an upper handle and a lower handle;

the upper handle of the second positive clamp and the lower handle of the second negative clamp being hingedly connected with a spring;

the second negative clamp having an upper handle and a lower handle; and the upper handle of the second negative clamp and the lower handle of the second negative clamp being hingedly connected with a spring;

the upper handle of the second negative clamp and the lower handle of the second negative clamp being connected at a center point of the upper handle of the second negative clamp and the lower handle of the second negative clamp; and the upper handle of the first positive clamp and the lower handle of the second positive clamp being connected at a center point of the upper handle of the second positive clamp and the lower handle of the second positive clamp.

7. The jumper cable assembly as claimed in claim 6 comprising:

a plurality of second positive clamp teeth being positioned on the interior of the upper handle of the second positive clamp and the interior surface of the lower handle of the second positive clamp; and a plurality of second negative clamp teeth being positioned on the interior of the upper handle of the second negative clamp and the interior surface of the lower handle of the first negative clamp.

8. A jumper cable assembly comprising:

a first jumper unit;

a second jumper unit;

the first jumper unit comprising a first negative clamp, a first positive clamp, and a plug;

the first jumper unit further comprising a first positive cable and a first negative cable;

the plug having an exposed face and a connecting face;

the plug having a plurality of finger grips;

the plug having a switch positioned on the exterior surface in between the plurality of finger grips each of the plurality of finger grips being on the exterior surface of the plug;

the first positive cable and the first negative cable being centrally positioned on the exposed face of the plug;

the first positive clamp being connected to the first positive cable opposite the plug; and the first negative clamp being connected to first negative cable opposite the plug.

9. The jumper cable assembly as claimed in claim 8 comprising:

the first positive clamp and the first negative clamp having an LED light located on exterior surface of the clamp;

the plug being cylindrical in shape;

the connecting face having a plurality of sockets;

the first positive clamp having an upper handle and a lower handle;

the upper handle of the first positive clamp and the lower handle of the first negative clamp being hingedly connected with a spring; and the first negative clamp having an upper handle and a lower handle.

10. The jumper cable assembly as claimed in claim 8 comprising:

the upper handle of the first negative clamp and the lower handle of the first negative clamp being hingedly connected with a spring;

the upper handle of the first negative clamp and the lower handle of the first negative clamp being connected at a center point of the upper handle of the first negative clamp and the lower handle of the first negative clamp; and the upper handle of the first positive clamp and the lower handle of the first positive clamp being connected at a center point of the upper handle of the first positive clamp and the lower handle of the first positive clamp.

11. The jumper cable assembly as claimed in claim 10 comprising:

a plurality of first positive clamp teeth being positioned on the interior of the upper handle of the first positive clamp and the interior surface of the lower handle of the first positive clamp;

a plurality of first negative clamp teeth being positioned on the interior of the upper handle of the first negative clamp and the interior surface of the lower handle of the first negative clamp.

12. The jumper cable assembly as claimed in claim 8, comprising:

the second jumper unit comprising a second negative clamp, a second positive clamp, and a port;

the second positive clamp and the second negative clamp having an LED light located on exterior surface of the clamp;

the port being cylindrical in shape; and the second jumper unit further comprising a second positive cable and a second negative cable.

13. The jumper cable assembly as claimed in claim 12, comprising:

the port having a cover;

the port having an exposed face and a covered face having a flat edge and a concave edge;

the cover being pivotably connected to the flat edge of the covered face;

the second positive cable and the second negative cable being centrally positioned on the exposed face of the port.

14. The jumper cable assembly as claimed in claim 13, comprising:

the second positive clamp being connected to the second positive cable opposite the plug;

the second negative clamp being connected to second negative cable opposite the plug;

the covered face having a counterbore; and a plurality of pins being positioned inside the counterbore.

15. The jumper cable assembly as claimed in claim 12, comprising:
  the second positive clamp having an upper handle and a lower handle;
  the upper handle of the second positive clamp and the lower handle of the second negative clamp being hingedly connected with a spring;
  the second negative clamp having an upper handle and a lower handle; and
  the upper handle of the second negative clamp and the lower handle of the second negative clamp being hingedly connected with a spring;
  the upper handle of the second negative clamp and the lower handle of the second negative clamp being connected at a center point of the upper handle of the second negative clamp and the lower handle of the second negative clamp; and
  the upper handle of the first positive clamp and the lower handle of the second positive clamp being connected at a center point of the upper handle of the second positive clamp and the lower handle of the second positive clamp;
  a plurality of second positive clamp teeth being positioned on the interior of the upper handle of the second positive clamp and the interior surface of the lower handle of the second positive clamp.

16. The jumper cable assembly as claimed in claim 12 comprising:
  a plurality of second negative clamp teeth being positioned on the interior of the upper handle of the second negative clamp and the interior surface of the lower handle of the first negative clamp.

\* \* \* \* \*